May 5, 1970 — R. E. DOREMUS ET AL — 3,509,906
TAPPING FAUCET
Filed June 29, 1967
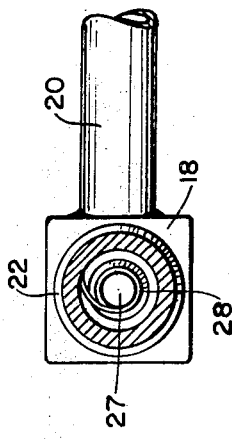
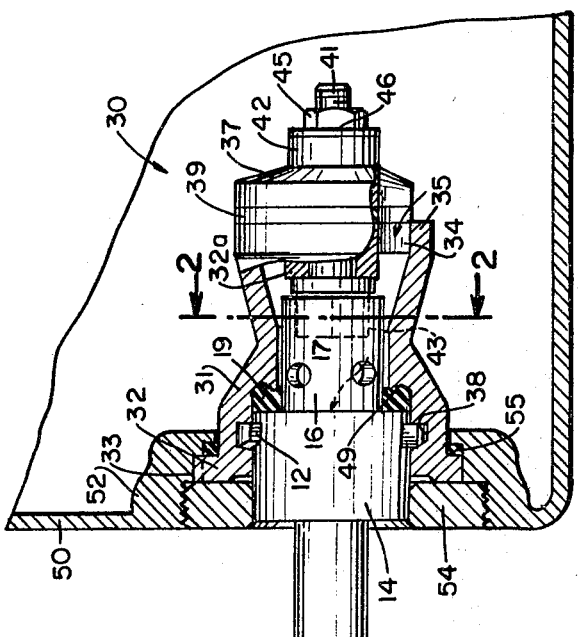
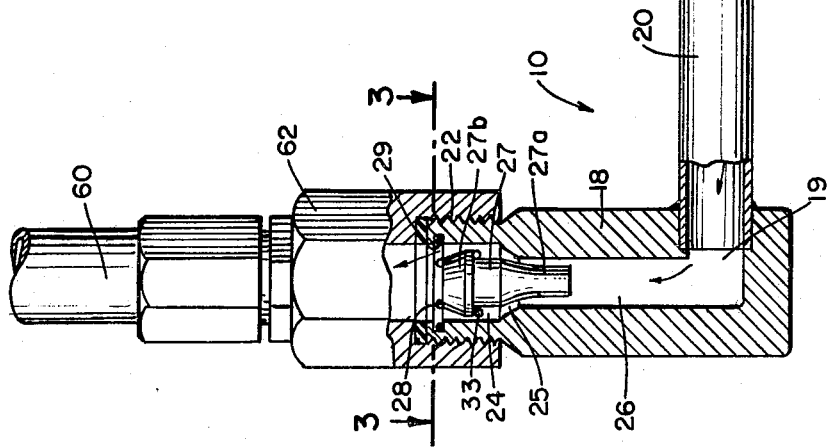
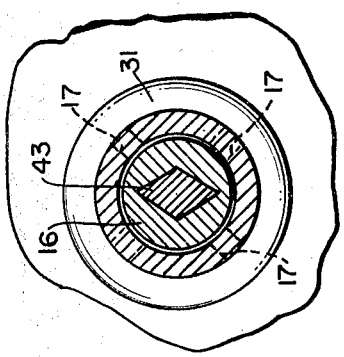
INVENTORS
R. ELLSWORTH DOREMUS
RICHARD E. DOREMUS
BY Darby & Darby
ATTORNEYS

United States Patent Office 3,509,906
Patented May 5, 1970

3,509,906
TAPPING FAUCET
R. Ellsworth Doremus, Clifton, and Richard E. Doremus, Upper Montclair, N.J., assignors to Golden Gate Manufacturing Company, Clifton, N.J., a corporation of New Jersey
Filed June 29, 1967, Ser. No. 650,124
Int. Cl. F16l 37/28; B67d 1/08
U.S. Cl. 137—323         9 Claims

ABSTRACT OF THE DISCLOSURE

A tapping faucet for emptying the contents of a keg including a tapping member for opening and closing a valve in the keg and an outlet member for connection to a hose which is in turn connected to a dispensing device. The tapping faucet includes an automatic shut-off valve for preventing fluid in the hose from draining out when the valve is disengaged from a keg.

---

In one type of system for tapping kegs containing fluids such as beer, a two valve system, which is described in our Pat. 2,992,654 issued July 18, 1961 entitled Valve Member and Seat Material which is assigned to the same assignee, is used. This system utilizes a faucet to open and close a valve located in the keg. The faucet performs two functions: the first opening and closing the valve, and the second coupling the keg valve by a hose to a dispensing device which is usually located at a point remote from the keg. Another valve is used to supply air or gas to the keg.

Heretofore, tapping faucets for use in the Golden Gate system have been of a conventional type and generally comprise a keg tapping member to open and close the valve in the keg with a stop-cock type of valve member for connecting the output of the keg to the dispensing device. In operation, when a prior art faucet is to be connected to a keg, the stop-cock is closed to prevent any fluid in the coupling hose from draining out and the keg tapping part of the faucet is placed into the keg valve to open it. The faucet is then connected to the dispensing device and the stop-cock is opened. After the keg is emptied of its contents, the stop-cock is closed and another keg is tapped in the manner previously described.

While such prior devices are operative, they have several disadvantages. First of all, they necessitate the opening and closing of the stop-cock thereby requiring some time and effort in moving the faucet device from one keg to another. Additionally, the stop-cock type of valve gives rise to some problems in that washers or O-rings are required and that the faucet can drip. As another disadvantage, such prior art devices are relatively costly to make.

In accordance with the present invention, a novel tapping faucet is provided which eliminates many of the disadvantages of the prior art devices and also is relatively inexpensive to make. In accordance with the invention, the tapping faucet includes a tapping member which is used to open and close the keg valve. This tapping member is integrally connected to a check valve type of arrangement which in turn is to be coupled to a hose connected to a dispensing turn. The tapping faucet of the present invention is relatively simple to operate in that all that the operator is required to do is to insert the tapping member into the keg valve and turn it. This opens the keg valve, causing fluid to flow into the faucet and to move the check valve to an open position so that the fluid can reach the dispensing device. When it is desired to move the tapping faucet to tap another keg, the weight and pressure of the fluid in the hose holds the check valve closed thereby preventing any fluid from running out of the coupling hose.

It is therefore an object of the invention to provide a novel tapping faucet which incorporates the functions of a tapping device and shut-off valve, the latter of which operates automatically.

A further object of the invention is to provide a novel tapping faucet which operates automatically to retain fluid in a line coupling the faucet to a dispensing device.

Other objects and advantages of the present invention will become more apparent upon reference to the following specification and annexed drawings, in which, FIG. 1 is an elevational view, taken partially in cross-section, showing the novel tapping faucet of the present invention attached to a valve in a keg;

FIG. 2 is a cross-sectional view of the tapping faucet taken along lines 2—2 of FIG. 1; and FIG. 3 is a top view of the output end of the tapping faucet.

Referring to the various figures of the drawings, the tapping faucet 10 is shown operating valve 30 located in the wall of a barrel 50. The valve 30 is of the rotary disc seal type which is described in our aforesaid patent and includes a hollow body 31 having a flanged lower end 32. This permits the entire valve to be secured in a threaded flanged fitting 52 in the wall of the keg at the lower end thereof by a threaded lock ring 54 which engages valve flange 32. A washer 55 is located between a valve flange 32 and fitting 52. A key 33 is provided on the valve flange 32 to locate the valve 30 in the keg wall in a corresponding key-way in the fitting 52.

The valve 30 has a port 34 formed in its end wall 35, this port being opened and closed by a valve member 37. A seat 39 is interposed between the valve member 37 and the end wall 35. The seat can be fastened to the valve member 37 in accordance with aforesaid patent.

The valve member 37 and seat member 39 are held in sealing relationship against the end wall 35 by a threaded bolt 41 which passes through a boss 32a in the valve body and a boss 42 on the outside of valve member 37. The head 43 of the bolt has a generally diamond, or other suitable keying shape, with a flange which rides against the boss 32a. A nut 45 and washer 46 hold the assembly together. O-rings and washers are provided to seal the valve but these are not shown for the sake of clarity. They are described in our aforesaid patent.

The inner wall of the valve body 31 is provided with a pair of half-threads 38 to accommodate the key lugs 12 of the head 14 of the tapping portion of the faucet 10. The end 16 of the head 14 is of reduced diameter and it extends into a corresponding reduced diameter portion of the valve body. The end 16 of the head is suitably shaped to mate with and accommodate the shaped end 43 of the bolt 41. A plurality of fluid inlet apertures 17 are formed around the periphery of the reduced diameter head end 16. These apertures admit fluid from the keg into the tapping faucet. The head 14 is seated within the valve body and the lock ring 54 of the barrel. Fluid leakage is prevented by a washer 19 which seats against a boss 49 on the inside of the valve body.

A tube 20 is fastened to the head 14. If desired both the head and the tube can be integrally formed as an integral piece by any suitable process.

The other end of the tube 20 is connected, such as by welding or soldering to a valve outlet body 18 at an inlet 19. One-piece integral construction also can be used here, if desired. The upper end of the of the body 18 is formed with a threaded exterior portion 22 surrounding an outlet opening 24. The opening 24 narrows down and has a sloped shoulder 25 communicating with a passageway 26 in the body 18. The latter passageway communicates with the tube 20.

A check plug 27 is held within the upper end of the body 18 by a spiral spring 28 which snaps into a groove 29 on the inner wall of the body's upper end. The plug is preferably made of nylon, Teflon, or other suitable material which can be shaped. Check plug 27 has a tapering lower portion 27a of reduced diameter which fits within the passageway 26 and upper head portion 27b of enlarged diameter. The tapered lower portion 27a of the plug ensures that the plug will always be seated to close passage 26 in the absence of fluid flow into faucet body 18 from tube 20. A sealing washer 33 fits around the plug underneath the head 27b to enhance the sealing action of the plug.

As seen in FIG. 1, the enlarged portion 27b of the plug is also tapered, narrowing down slightly at the head end opposite the spring 28. This taper allows the fluid to pass more easily through the portion of the body outlet defined by wall portion 24. If straight sides are used for plug portion 27b a considerable amount of turbulence is produced which restricts the fluid flow.

The body 18 of the tapping faucet is adapted for connection to a hose 60 by a threaded coupling member 62 of conventional construction. The output end of the hose is connected to a dispensing device (not shown) usually located at a remote distance from the keg 50. The hose 60, coupling member and dispensing device form no part of the present invention. In a normal application, where the keg 50 contains beer, the keg is in a basement and the dispensing device located one or more floors above. Pressure is applied into the barrel 50, from another valve (not shown) so that the fluid can be pushed from the keg 50 out of the barrel through the keg valve 30.

The tapping faucet of the present invention operates in the following manner. First the hose 60 is connected to body 18 of the tapping faucet 10 by coupling member 62. When it is desired to tap a keg, the head end 14 of the faucet is inserted into the inner part of the keg valve member 30 and the tapping faucet is rotated in a direction to move the valve member 37 and seat 39 from the position where it closes the port 34 to a position where the port 34 is open. The liquid under pressure within the keg 50 is now free to flow through the keg valve port 35 into the apertures 17 on the head end of the faucet. The liquid travels through the tube 20 and into the passageway 26 of tapping faucet body 18. The pressure of the fluid forces the plug away from shoulder 25 so that the beverage can flow out of the body of the faucet and into the hose 60 to the dispensing device. Spring 28 retains plug 27 in the body and prevents it from entering hose 60 and stopping it up.

When it is desired to tap another keg 50 after the contents of the first one has been emptied, all that is necessary to do is to rotate the tapping faucet in a direction opposite from that previously described so that the valve member 37 closes off port 34. The head end of the tapping faucet is now free to be removed from the interior of the valve 30. Rather than close off a stop-cock as required in prior art faucets so that the fluid in the hose 60 cannot drain out, no further action is necessary with the tapping faucet 10. This is so because the fluid in the hose 60 has a head which is sufficient to move the check plug 27 in a direction (down as shown in FIG. 1) to seal the plug against shoulder 25 and close the faucet. No fluid can leak out of the tapping faucet head end 16 at this time. The tapping faucet can be left disengaged or inserted into the valve 30 of another keg and rotated to open the valve member. The tapping faucet then operates in the manner previously described.

It should be understood that the tapping faucet of the present invention is relatively simple to make and requires considerably fewer parts than that necessary with prior art faucets, using stop-cocks. Also there is less problem with respect to leakage and it is easier for an operator to tap a number of kegs than with prior art faucet devices.

What is claimed is:

1. A tapping faucet having two intercommunicating legs of rigid material connected to form a generally L-shaped structure for a keg containing fluid and having a rotary disc sealing valve thereon to permit removal of the fluid in the keg, said faucet having an output means at one end thereof on one leg of the structure adapted for connection to a hose through which the fluid is to pass, first means at the other end of the structure on the other leg adapted for engaging and operating the rotary disc sealing valve in the keg to admit fluid into the tapping faucet, check valve means at said end of said structure having said output means which is moved to an open position in response to the pressure of the fluid in the keg passing through the faucet to permit the fluid to flow to the hose through said output means and which automatically closes the output means in response to the fluid in the hose when the faucet is removed from the keg to prevent the fluid in the hose from draining out said faucet from the end having said first means.

2. A tapping faucet as set forth in claim 1 wherein the output means comprises a body having a passage therein, and wherein the check valve means includes a plug located in the output end of the body.

3. A tapping device as in claim 2 wherein said check valve plug is free floating.

4. A tapping device as set forth in claim 3 wherein the plug has a tapered lower portion and the body is formed with a tapering wall portion at the output of the passage against which said plug portion can seat and seal off the passageway.

5. A tapping device as set forth in claim 4 wherein said plug has a tapered upper portion to permit fluid flow through the upper end of the body passage.

6. A tapping device as set forth in claim 5 further comprising spring means for holding said plug within said body.

7. A tapping device as set forth in claim 3 wherein the plug has a tapered lower portion and the body is formed with a tapering wall portion at the output of the passage against which said plug portion can seat and seal off the passageway.

8. A tapping device as set forth in claim 7 wherein said plug has a tapered upper portion to permit fluid flow through the upper end of the body passage.

9. A tapping device as set forth in claim 8 further comprising spring means for holding said plug within said body.

References Cited

UNITED STATES PATENTS

| 3,115,150 | 12/1963 | Sariotti et al. | 137—323 X |
| 3,000,365 | 9/1961 | Neiss | 137—614.2 X |
| 3,273,587 | 9/1966 | Fausek et al. | 137—323 |
| 3,331,389 | 7/1967 | Kirk | 137—537 X |
| 3,336,942 | 8/1967 | Keith et al. | 137—537 X |

WILLIAM F. O'DEA, Primary Examiner

D. R. MATTHEWS, Assistant Examiner